United States Patent
Williams

(10) Patent No.: US 7,476,273 B2
(45) Date of Patent: *Jan. 13, 2009

(54) CEMENTITIOUS BLOCK MATERIAL UTILIZING SPENT BLASTING ABRASIVE PARTICLES

(75) Inventor: Raymond F. Williams, Massillon, OH (US)

(73) Assignee: U.S. Technology Corporation, Canton, OH (US)

( * ) Notice: Subject to any disclaimer, the term of this patent is extended or adjusted under 35 U.S.C. 154(b) by 373 days.

This patent is subject to a terminal disclaimer.

(21) Appl. No.: 11/166,429

(22) Filed: Jun. 24, 2005

(65) Prior Publication Data

US 2007/0012219 A1    Jan. 18, 2007

Related U.S. Application Data

(63) Continuation-in-part of application No. 10/825,733, filed on Apr. 15, 2004, now Pat. No. 7,438,757.

(51) Int. Cl.
*C04B 18/04* (2006.01)

(52) U.S. Cl. .................. 106/713; 106/724; 106/823; 588/255; 588/257

(58) Field of Classification Search .......... 106/724, 106/713, 823; 588/255, 257
See application file for complete search history.

(56) References Cited

U.S. PATENT DOCUMENTS 4,058,406 A * 11/1977 Raponi
4,398,960 A *  8/1983 Murray .............. 106/738
4,673,437 A *  6/1987 Gelbman

OTHER PUBLICATIONS

Answer 70 of 165 Chem Abst on STN JP 20000053457 (Feb 22, 2000) Hoshino et al. abtract only.*
Answer 120 of 165 of Chem Abst on STN JP 05085797 (Apr. 6, 1993) Nakane et al. abstract only.*
Answer 14 of 36 of Chem Abst on STN "Reuse of abrasive blast media from ship building industry into concrete", White et al., Hazardous and Industrial Wastes (1998), 30th, 257-266.*
Answer 20 of 36 of Chem Abst on STN "Recycling of spent abrasive media in non-structural concrete", Webster et al., Jrnl of Environmental Engineering, (1996), 122(9), 840-849.*
Answer 29 of 36 of Chem Abst on STN JP 05132343 (May 28, 1993), Yoshii et al. abstract only.*
Answer 38 of 36 of Chem Abst on STN JP 05139807 (Jun 8, 1993) Yoshii et al. abstract only.*

* cited by examiner

*Primary Examiner*—Paul Marcantoni
(74) *Attorney, Agent, or Firm*—Sand & Sebolt

(57) ABSTRACT

An accelerated-curing concrete masonry unit (CMU) mixture includes aggregate material, hydraulic cement and spent blasting abrasive particles, and may also include paint residue particles. The abrasive particles or abrasive and paint particles combined preferably make up at least 5.0% of the mixture by volume. Preferably, the hydraulic cement is Portland cement and the abrasive or combined particles make up about 10.0% to 17.0% of the mixture by volume. The abrasive particles typically have a fineness modulus ranging from 0.6 to 1.5 and more preferably from 0.75 to 1.2. Plastic particles may make up some or all of the abrasive particles. CMUs formed with this mixture are substantially more water repellent than standard CMUs and have a water absorption often no greater than 9.0 pounds per cubic foot. Preferred CMUs have an average net compressive strength of over 2,500 psi while levels of 3,000 psi or 3,500 psi are not uncommon.

40 Claims, 1 Drawing Sheet

CEMENTITIOUS BLOCK MATERIAL UTILIZING SPENT BLASTING ABRASIVE PARTICLES

CROSS-REFERENCE TO RELATED APPLICATIONS

This application is a continuation-in-part of U.S. application Ser. No. 10/825,733, filed Apr. 15, 2004 now U.S. Pat. No. 7,438,757 the entire specification of which is incorporated herein by reference.

BACKGROUND OF THE INVENTION

1. Technical Field

The invention relates generally to cementitious block or concrete masonry units (CMUs) and a mixture of materials forming the CMU. More particularly, the invention relates to CMU material which provides improved characteristics such as water repellency. Specifically, the invention relates to such a CMU material which includes spent blasting abrasives of a suitable size and a sufficient amount to produce a highly desirable CMU having increased compressive strength and substantially improved water repellency and other characteristics.

2. Background Information

Concrete masonry units (CMUs) have long been used in the construction industry to provide a relatively inexpensive and strong building unit, especially in comparison to the use of bricks which typically have a higher cost due to the necessity of firing the bricks to fairly high temperatures. While CMUs have been widely used, there is still room to improve on the various characteristics thereof. CMUs are primarily formed through the combination of aggregates and a hydraulic cement, such as Portland cement, which when mixed with water and allowed to cure provides a binder which binds the aggregates together to provide the relatively strong structural building unit. One of the detrimental characteristics of the typical CMU is the substantial porosity thereof, which allows water to readily be absorbed by the CMU and thereby flow through the CMU. This of course presents a substantial issue in rainy climates particularly where driving rain is common. In addition, while the use of light weight aggregates has allowed for the formation of CMUs which are of a lighter weight while maintaining a suitable compressive strength, there is still room for improvement in producing lighter weight CMUs. Further, there is substantial room for economically improving the compressive strength of CMUs. In addition, in climates which do not have a suitably high humidity, the curing of the CMUs typically uses steam or an artificially created high humidity environment which is heated in order to cure the CMUs within a reasonable period of time. Thus, there is also a need for a CMU material which will allow for the reduction of the curing time of the CMU.

The present invention provides improvements in these areas and other benefits which will be evident from the following description of the invention.

BRIEF SUMMARY OF THE INVENTION

The present invention provides a concrete masonry unit (CMU) mixture comprising aggregate material; hydraulic cement; and a plurality of spent blasting abrasive particles.

BRIEF DESCRIPTION OF THE SEVERAL VIEWS OF THE DRAWINGS

Preferred embodiments of the invention, illustrative of the best modes in which applicant contemplates applying the principles, are set forth in the following description and are shown in the drawings and are particularly and distinctly pointed out and set forth in the appended claims.

Similar numbers refer to similar parts throughout the specification.

DETAILED DESCRIPTION OF THE INVENTION

Figure 1:
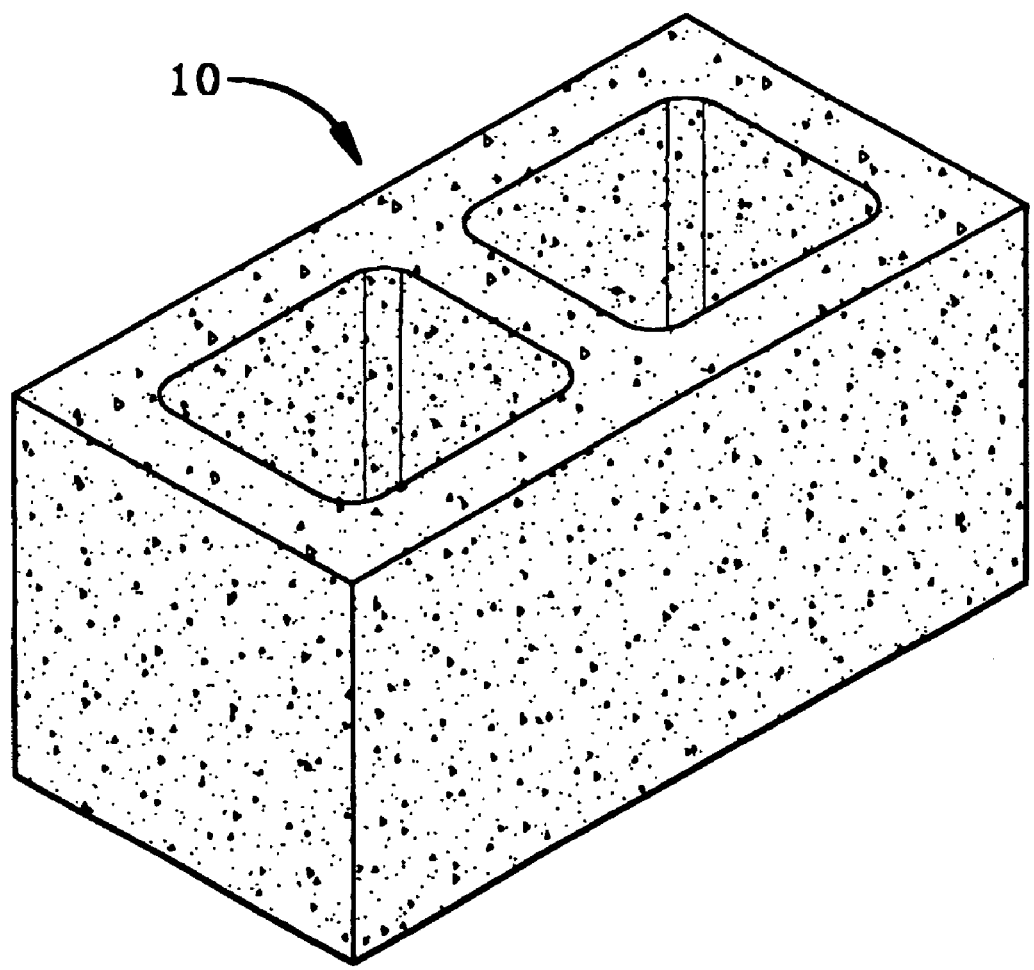
FIG. 1 is a perspective view of one type of concrete masonry unit which may be formed with the material of the present invention.

The concrete masonry unit (CMU) of the present invention is indicated generally at 10 in FIG. 1. CMU 10 is a hollow construction block which is typically approximately 8 inches by 8 inches by 16 inches. However, CMU 10 is intended to represent any CMU, of which there are an infinitely wide variety. Typical CMUs may be either hollow or solid and may vary in height, width and length. Some of the typical CMUs are known by such terms as starter, sash, half sash, solid or hollow bond beam, half height, corner, "L" corner, and the like. Such CMUs are typically standard blocks or split face blocks having at least one face with a more natural looking texture for added aesthetic appeal. However, CMUs can be made in virtually any imaginable shape with a substantial variety of textures and configurations. The key aspect of the present invention is the material of which CMU 10 is formed and the advantageous properties thereof.

CMU 10 is formed of aggregate material, hydraulic cement and in accordance with the invention, spent blasting abrasive particles (BAPs) and paint residue particles (PRPs). As a result of the inclusion of the BAPs or the BAPs and PRPs combined, CMU 10 is lighter in weight, has a decreased water absorption, decreased water penetration, allows for a substantial increase in net compressive strength, and reduces the amount of paint needed when it is desired that CMU 10 be painted. The use of these particles also reduces the curing time of CMU 10. The aggregate material of the mixture includes a broad category of materials which are typically rocks or minerals. Some commonly used aggregate materials are limestone, granite, basalt, sand, pumice, cinders, slag, and gravel (such as calcareous and siliceous gravel).

As with prior art CMUs, the aggregate material of CMU 10 is most commonly chosen from rock material within a local or regional area. Within the industry, the aggregate material is generally divided into the categories of coarse aggregate, fine aggregate and light weight aggregate. The specific materials listed above typically make up the coarse and fine aggregates. Typical light weight aggregate is a clay, shale, slate, slag or pumice which has been heated to a temperature sufficient to cause the material to expand.

To insure an aggregate material which is suitably divided into various particle sizes, the aggregate material is sorted out by passing the material through various sieve screens, as is typically done within the industry. A sieve analysis of the CMU mixture is typically performed with the following number sieve screens: 4, 8, 16, 30, 50, 80 and 100. Anything that passes through the number 100 screen falls into a pan. The coarse aggregate is the material retained on the number 4, number 8, and number 16 screens. Fine aggregate is the material retained on number 30, number 50, number 80 and number 100 screens, as well as the material in the pan.

The hydraulic cement may be of any suitable type for forming a CMU although Portland cement is preferred. Typically, this is a Portland cement or modified Portland cement in accordance with ASTM C-90, Standard Specification for Loadbearing Concrete Masonry Units, and in particular, ASTM C-90-03, the latest version of this standard at the time of this application. Cement usually makes up about 6.0% to 14.0% of the CMU mixture by volume, and more typically, about 8.0% to 12.0%. The cement to aggregate material ratio by volume typically ranges from 1:6 to 1:12 and more preferably from 1:7 to 1:10.

In accordance with the invention, the spent blasting abrasive particles in the mixture are now discussed. The BAPs of the mixture may include spent plastic blast media (PBM), which is a soft blast media, and/or other spent blasting abrasives which are further detailed below. The BAPs may be formed entirely of spent PBM, entirely of one of the other blasting abrasives, or may be a mixture of any of the PBMs and/or other abrasives. BAPs are entrained in pressurized air for use in removing paint and the like from aircraft or other objects. In contrast to hard blast media, PBMs and other soft blast media are preferred for removal of paint from aircraft and the like in order to prevent damage to the metal structures of the aircraft during the blasting process. The BAPs are gradually broken down into smaller sizes to the extent that they are no longer useful as blast material. During blasting to remove paint, the BAPs during blasting become mixed up with fine particles of paint residue (PRPs) from the aircraft or the like. While the spent BAPs may be separated from the PRPs, this is typically not done, in accordance with regulations such as those of the EPA. The vast majority of cured paints which are removed as PRPs by such blasting are formed of a plastic material and commonly include materials such as epoxies, polyurethanes, polyesters, gel coats and vinyls. Most often, these are thermoset plastic materials. The hardness of the epoxy and polyurethane PRPs on the MOH scale typically ranges from about 2.0 to 3.0.

Currently, the types of plastic used to form PBMs are polyester, urea formaldehyde, melamine formaldehyde (each of which is an amino thermoset plastic) and acrylic (which is a thermoplastic material). The hardness of these materials on the MOH scale ranges from about 3.0 to 4.0. Generally, it is preferred that any plastic particles used in the CMU mixture be of a thermoset plastic material because these are typically harder than thermoplastic materials, although this is not always true as evidenced by the acrylic mentioned above. The other blasting abrasives mentioned above include aluminum oxide, copper slag, coal or boiler slag, glass frit, glass bead, garnet, ferric oxide (hematite) and staurolite. The hardness of these other blasting abrasives on the MOH scale ranges from about 5.0 to 6.0 while the hardness of spent BAPs on the MOH scale typically ranges more broadly from about 2.5 to 7.0.

Although lesser amounts of the spent BAPs or a BAP-PRP combination may provide desirable characteristics to the CMU mixture, it is preferred that the BAPs or the combination make up at least 5% of the mixture by volume. Preferably, this amount ranges from 5.0% to 17.0%, more preferably, from 7.0% to 16.0% and even more preferably, from 10.0% to 16.0% or 10.0% to 15.0%. The ratio by volume of cement to combined aggregate material and BAPs typically ranges from 1:7 to 1:13 and often from 1:8 to 1:12. These ranges may vary, however. Preferably, all or substantially all of the BAPs are passable through the number 50 sieve screen with a portion of the BAPs passing through the number 100 sieve screen with a portion retained thereon. Preferably, the BAPs have a fineness modulus (FM) range from 0.6 to 1.5, and more preferably from 0.75 to 1.2.

In accordance with the invention, the CMU mixture when cured provides several highly desirable characteristics, including decreased water absorption, decreased water penetration and increased net compressive strength. The cured CMU mixture meets or exceeds all of the physical requirements established by ASTM C-90-03. Prior art CMU mixtures have capillaries or interstitial spaces which provide substantial porosity in the cured material. The substantial reduction of water absorption and water penetration in the CMU mixture of the present invention is a result of the BAPs filling the capillaries or interstitial spaces of the cured CMU mixture. A sufficient amount of the BAPs must be sufficiently small to fill these capillaries or interstitial spaces to provide the reduced water absorption and penetration. The size ranges of the BAPs described above reflect this capability. Preferably, the CMU mixture has an average water absorption which is no greater than 13.0 pcf (pounds per cubic foot) and is more preferably no greater than 11.0 pcf, 10.0 pcf or 9.0 pcf. Depending upon the specific mixture, the water absorption may be as low as a 8.0 pcf or even lower.

The water absorption of the CMU mixture easily meets and is typically far superior to the various ASTM C-90-03 requirements. CMUs are typically referred to in the industry as either lightweight, medium weight or normal weight. More particularly this refers to the density of the CMU mixture wherein a lightweight CMU has an average oven-dry density which is less than 105 pcf; a medium weight CMU has an average oven-dry density ranging from 105 pcf to less than 125 pcf; and a normal weight CMU has an average oven-dry density which is at least 125 pcf. The ASTM C-90-03 standard uses a maximum average water absorption of 18 pcf for lightweight CMUs, 15 pcf for medium weight CMUs and 13 pcf for normal weight CMUs. Test data showing water absorption and other characteristics of several variations of the CMU mixture are provided further below.

As noted in ASTM E 514-90 (Standard Test Method for Water Penetration and Leakage Through Masonry), water penetration testing through masonry is difficult to measure very accurately due to the many variables which impact such water penetration and leakage. Having said that, however, Applicant has performed tests based on the criteria outlined in ASTM E 514-90 and has determined that the CMU mixture of the present invention when cured far exceeds the minimum four-hour test criteria outlined in said standard. More particularly, a hollow CMU like CMU 10 was placed in a catch basin above the water level within the basin. A "spray bar" saturated the outer face of the CMU via a water pump. More particularly, the "spray bar" included a pipe with holes drilled along one side to allow water to flow through the pipe and out of the holes onto the face of the block. Three tests were conducted separately on three separate specimens for a continuous period of seven days, twenty-four hours per day, during which no signs of water penetration to the core of the hollow test specimens was observed. By contrast, a prior art hollow CMU tested in the same manner exhibited substantial water penetration to the core within a few minutes. Thus, even given the understandable variability in sensing water penetration and leakage, the CMU mixture of the present invention provided a substantially minimized water penetration.

The CMU mixture when cured has an average compressive strength which easily meets and often far exceeds the ASTM C-90-03 minimum requirement of 1,900 pounds per square inch (psi) net area, herein referred to as the average net compressive strength. Depending upon the particular CMU mixture, the average net compressive strength may easily be, for example, 2,200 psi, 2,500 psi, 3,000 psi, 3,500 psi and even above 4,000 psi for certain mixtures. This ability to produce CMUs with such substantially increased net compressive strength values was an unexpectedly beneficial result of the use of the BAPs in the CMU mixture. These increased values are best explained by the BAPs within the mix allowing for the retention of a far greater amount of water when the mixture and water are combined and blended prior to forming CMU 10. Thus, when CMU 10 is in its plastic state, it holds a substantially greater amount of water than a standard CMU of comparable size. The ability of CMU 10 to retain this increased amount of water due to the use of the BAPs was also a surprising result and is directly related to the increased compressive strength values. Because more water is retained due to the BAPs, more of the cement is hydrated, which allows for the increased compressive strength of the cured mixture. By way of example, a mixture which is normally used to form a typical CMU without BAPs may be adjusted in a simple manner such that fine aggregate material within that mixture is replaced with the same or a similar volume of the BAPs in order to substantially increase the net compressive strength without changing the percentage of cement within the mixture. Where the BAPs used to replace the fine aggregate material in such an example make up approximately 10% to 15% of the CMU mixture, the average net compressive strength may easily be increased by 400 psi to 500 psi without any additional changes.

In addition to the improved characteristics noted above, the CMU mixture of the present invention reduces the curing time for CMU 10. Depending upon the locale in which a standard CMU mixture is cured, the use of steam or a high humidity environment plus heat maybe used to accelerate the curing process. In locales where the humidity is sufficiently high, this may not be necessary. Regardless of the humidity within a locale, the CMU mixture of the present invention allows the curing to proceed at a faster rate. This is due again to the ability of the BAPs to hold additional water, thus adding to the water content of the CMU while maintaining the shape and texture of the CMU, that is, without slump. This higher water content in the CMU mixture allows the mixture to cure more quickly, and as previously noted to have a greater strength when cured. Because of this higher water content, the CMU mixture of the present invention eliminates the need for curing with water vapor or steam and the use of a kiln to heat the CMU mixture even in locales where the humidity is not sufficiently high enough to allow this with a standard CMU mixture.

Provided below are several examples of the composition and characteristics of lightweight, medium weight and normal weight CMU mixtures of the present invention. In the tables below, the BAPs are referred to as "media".

EXAMPLE NO. 1

| Light Weight | | | | | |
|---|---|---|---|---|---|
| Material | Weight (lbs) | Volume (cu. ft.) | % Total Volume | Cement to aggregate ratio | Cement to (aggregate + media) ratio |
| Cement | 500 | 5.3 | 9.2 | 1:8.49 | 1:9.85 |
| Fine Aggregate | 250 | 2.5 | 4.3 | | |
| Coarse Aggregate | 835 | 9.8 | 17.0 | | |
| Light Weight | 1830 | 32.7 | 56.9 | | |
| Media | 350 | 7.2 | 12.5 | | |
| Total | 3765 | 57.5 | 99.9 | | |

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 2579 | | | | | | |
| 2 | 2809 | | | | | | |
| 3 | 2981 | 2790 | 1900 | | | | |
| 4 | | | | 11.53 | 11.53 | 18.0 | 95.39 |

EXAMPLE NO. 2

| Medium Weight | | | | | |
|---|---|---|---|---|---|
| Material | Weight (lbs) | Volume (cu. ft.) | % Total Volume | Cement to aggregate ratio | Cement to (aggregate + media) ratio |
| Cement | 500 | 5.3 | 9.9 | 1:7.75 | 1:9.11 |
| Fine Aggregate | 2500 | 25.0 | 46.6 | | |
| Coarse Aggregate | 0 | 0.0 | 0.0 | | |
| Light Weight | 900 | 16.1 | 30.0 | | |
| Media | 350 | 7.2 | 13.4 | | |
| Total | 4250 | 53.6 | 99.9 | | |

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 2772 | | | | | | |
| 2 | 2761 | | | | | | |
| 3 | 2737 | 2757 | 1900 | | | | |
| 4 | | | | 10.56 | 10.56 | 15.0 | 110.81 |

EXAMPLE NO. 3

| Normal Weight | | | | | |
|---|---|---|---|---|---|
| Material | Weight (lbs) | Volume (cu. ft.) | % Total Volume | Cement to aggregate ratio | Cement to (aggregate + media) ratio |
| Cement | 500 | 5.3 | 9.6 | 1:8.08 | 1:9.43 |
| Fine Aggregate | 3635 | 36.4 | 65.8 | | |
| Coarse Aggregate | 545 | 6.4 | 11.6 | | |
| Light Weight | 0 | 0.0 | 0.0 | | |
| Media | 350 | 7.2 | 13.0 | | |
| Total | 5030 | 55.3 | 100.0 | | |

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 3040 | | | | | | |
| 2 | 2877 | | | | | | |
| 3 | 3040 | 2986 | 1900 | | | | |
| 4 | | | | 9.28 | 9.28 | 13.0 | 125.80 |

EXAMPLE NO. 4

| Light Weight | | | | | |
|---|---|---|---|---|---|
| Material | Weight (lbs) | Volume (cu. ft.) | % Total Volume | Cement to aggregate ratio | Cement to (aggregate + media) ratio |
| Cement | 500 | 5.3 | 8.5 | 1:8.89 | 1:10.70 |
| Fine Aggregate | 1880 | 22.9 | 36.9 | | |
| Coarse Aggregate | 0 | 0.0 | 0.0 | | |
| Light Weight | 1280 | 24.2 | 39.0 | | |
| Media | 450 | 9.6 | 15.5 | | |
| Total | 4110 | 62.0 | 99.9 | | |

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 2940 | | | | | | |
| 2 | 3320 | | | | | | |
| 3 | 2910 | | | | | | |
| 4 | 3060 | | | | | | |
| 5 | 3150 | 3080 | 1900 | | | | |
| 6 | | | | 9.50 | | | |
| 7 | | | | 9.20 | 9.35 | 18.0 | 101.25 |

EXAMPLE NO. 5

| Medium Weight | | | | | |
|---|---|---|---|---|---|
| Material | Weight (lbs) | Volume (cu. ft.) | % Total Volume | Cement to aggregate ratio | Cement to (aggregate + media) ratio |
| Cement | 500 | 5.3 | 8.5 | 1:9.00 | 1:10.81 |
| Fine Aggregate | 2600 | 31.7 | 50.6 | | |
| Coarse Aggregate | 0 | 0.0 | 0.0 | | |
| Light Weight | 850 | 16.0 | 25.6 | | |
| Media | 450 | 9.6 | 15.3 | | |
| Total | 4400 | 62.6 | 100.0 | | |

-continued

Medium Weight

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 4050 | | | | | | |
| 2 | 4090 | | | | | | |
| 3 | 4460 | | | | | | |
| 4 | 4240 | | | | | | |
| 5 | 4000 | 4170 | 1900 | | | | |
| 6 | | | | 8.70 | | | |
| 7 | | | | 8.50 | 8.60 | 15.0 | 110.10 |

EXAMPLE NO. 6

Normal Weight

| Material | Weight (lbs) | Volume (cu. ft.) | % Total Volume | Cement to aggregate ratio | Cement to aggregate + media) ratio |
|---|---|---|---|---|---|
| Cement | 500 | 5.3 | 8.2 | 1:9.43 | 1:11.24 |
| Fine Aggregate | 4100 | 50.0 | 77.0 | | |
| Coarse Aggregate | 0 | 0.0 | 0.0 | | |
| Light Weight | 0 | 0.0 | 0.0 | | |
| Media | 450 | 9.6 | 14.8 | | |
| Total | 5050 | 64.9 | 100.0 | | |

| CMU No. | Net Comp. Strength (psi) | Ave. Net Comp. Strength (psi) | ASTM C-90 Std. Ave. Net Comp. Strength (psi) | Absorption (lb/cu. ft.) | Ave. Absorption. (lb/cu. ft.) | ASTM C-90 Std. Ave. Absorption (lb/cu. ft.) | Ave. Oven-dry density (lb/cu. ft.) |
|---|---|---|---|---|---|---|---|
| 1 | 3330 | | | | | | |
| 2 | 3520 | | | | | | |
| 3 | 3310 | | | | | | |
| 4 | 3500 | | | | | | |
| 5 | 3360 | 3400 | 1900 | | | | |
| 6 | | | | 8.86 | | | |
| 7 | | | | 9.12 | 9.00 | 13.0 | 126.90 |

Thus, the CMU mixture of the present invention and CMU 10 provide for a variety of advantages, to include a reduction in the curing time of the CMU mixture. In addition, the mixture utilizes spent BAPs and usually PRPs, thus recycling such BAPs and PRPs into a highly useful product. The inclusion of BAPs in the mixture substantially decreases water absorption of and water penetration into CMU 10. In addition, the use of the BAPs, especially plastic particles, decreases the weight of CMU 10 while nonetheless increasing the net compressive strength by a substantial amount. This decrease in weight of the CMU is advantageous in reducing the cost of construction time due in part to the ability of masons to lay more CMUs formed by the present CMU mixture than that of standard CMUs which are heavier. In addition, the decreased porosity of CMU 10 in comparison to a standard CMU reduces the amount of paint required to paint CMU10. This also reduces the amount of block filler used with a standard CMU when painting of the CMU is required.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A concrete masonry unit mixture comprising:
   aggregate;
   hydraulic cement;
   a plurality of spent blasting abrasive particles which are different than the aggregate;
   a plurality of paint residue particles;
   the blasting abrasive particles and paint residue particles in combination making up from 5.0% to 17.0% of the mixture by volume and having a fineness modulus in the range of 0.6 to 1.2.

2. The mixture of claim 1 wherein the blasting abrasive particles make up at least 5.0% of the mixture by volume.

3. The mixture of claim 2 wherein the plurality of blasting abrasive particles includes a plurality of plastic particles which make up at least 5.0% of the mixture by volume.

4. The mixture of claim 1 wherein the mixture when cured has an average water absorption which is no greater than 11.0 pounds per cubic foot.

5. The mixture of claim 1 wherein the combination has a fineness modulus in the range of 0.75 to 1.2.

6. The mixture of claim 1 wherein the combination makes up from 7.0% to 17.0% of the mixture by volume.

7. The mixture of claim 1 wherein the combination makes up at least 10.0% of the mixture by volume.

8. The mixture of claim 1 wherein the mixture when cured has an average net compressive strength of at least 2,500 psi.

9. The mixture of claim 8 wherein the mixture when cured has an average net compressive strength of at least 3,000 psi.

10. The mixture of claim 1 wherein the mixture when cured has an average oven-dry density which is less than 105 pounds per cubic foot and an average water absorption which is no greater than 15.0 pounds per cubic foot.

11. The mixture of claim 10 wherein the average water absorption is no greater than 13.0 pounds per cubic foot.

12. The mixture of claim 1 wherein the mixture when cured has an average oven-dry density ranging from 105 pounds per cubic foot to less than 125 pounds per cubic foot and an average water absorption which is no greater than 13.0 pounds per cubic foot.

13. The mixture of claim 12 wherein the average water absorption is no greater than 11.0 pounds per cubic foot.

14. The mixture of claim 1 wherein the mixture when cured has an average oven-dry density which is at least 125 pounds per cubic foot and an average water absorption which is no greater than 11.0 pounds per cubic foot.

15. The mixture of claim 14 wherein the average water absorption is no greater than 10.0 pounds per cubic foot.

16. The mixture of claim 1 wherein the blasting abrasive particles include at least one of acrylic, melamine formaldehyde, urea formaldehyde, polyester, aluminum oxide, copper slag, boiler slag, coal slag, glass, garnet, staurolite and ferric oxide.

17. The mixture of claim 1 wherein the hydraulic cement is Portland cement.

18. The mixture of claim 1 wherein the hydraulic cement is one of Portland cement and modified Portland cement in accordance with the requirements of ASTM C-90-03.

19. The mixture of claim 4 wherein the mixture when cured has an average water absorption which is no greater than 10.0 pounds per cubic foot.

20. The mixture of claim 19 wherein the mixture when cured has an average water absorption which is no greater than 9.0 pounds per cubic foot.

21. The mixture of claim 20 wherein the mixture when cured has an average water absorption which is no greater than 8.0 pounds per cubic foot.

22. The mixture of claim 10 wherein the aggregate comprises a lightweight aggregate which makes up at least 30% of the mixture by weight and which is selected from one or more of the group consisting of a clay, shale, slate, slag or pumice which has been heated to a temperature sufficient to cause the material to expand.

23. The mixture of claim 10 wherein the mixture when cured has an average net compressive strength of at least 2,500 psi.

24. The mixture of claim 23 wherein the mixture when cured has an average net compressive strength of at least 3,000 psi.

25. The mixture of claim 23 wherein the aggregate comprises a lightweight aggregate which makes up at least 30% of the mixture by weight and which is selected from one or more of the group consisting of a clay, shale, slate, slag or pumice which has been heated to a temperature sufficient to cause the material to expand.

26. The mixture of claim 11 wherein the mixture when cured has an average water absorption which is no greater than 12.0 pounds per cubic foot.

27. The mixture of claim 26 wherein the mixture when cured has an average water absorption which is no greater than 11.0 pounds per cubic foot.

28. The mixture of claim 27 wherein the mixture when cured has an average water absorption which is no greater than 10.0 pounds per cubic foot.

29. The mixture of claim 12 wherein the aggregate comprises a lightweight aggregate which makes up at least 20% of the mixture by weight and which is selected from one or more of the group consisting of a clay, shale, slate, slag or pumice which has been heated to a temperature sufficient to cause the material to expand.

30. The mixture of claim 12 wherein the mixture when cured has an average net compressive strength of at least 2,500 psi.

31. The mixture of claim 30 wherein the mixture when cured has an average net compressive strength of at least 3,000 psi.

32. The mixture of claim 31 wherein the mixture when cured has an average net compressive strength of at least 3,500 psi.

33. The mixture of claim 32 wherein the mixture when cured has an average net compressive strength of at least 4,000 psi.

34. The mixture of claim 30 wherein the aggregate comprises a lightweight aggregate which makes up at least 20% of the mixture by weight and which is selected from one or more of the group consisting of a clay, shale, slate, slag or pumice which has been heated to a temperature sufficient to cause the material to expand.

35. The mixture of claim 13 wherein the mixture when cured has an average water absorption which is no greater than 10.0 pounds per cubic foot.

36. The mixture of claim 35 wherein the mixture when cured has an average water absorption which is no greater than 9.0 pounds per cubic foot.

37. The mixture of claim 15 wherein the mixture when cured has an average water absorption which is no greater than 9.0 pounds per cubic foot.

38. The mixture of claim 37 wherein the mixture when cured has an average water absorption which is no greater than 8.0 pounds per cubic foot.

39. The mixture of claim 1 wherein the cement makes up 6.0% to 14.0% of the mixture by volume.

40. The mixture of claim 39 wherein the ratio of cement to combined aggregate and blasting abrasive particles ranges from 1:7 to 1:13 by volume.

* * * * *